United States Patent
He et al.

(10) Patent No.: US 10,229,169 B2
(45) Date of Patent: Mar. 12, 2019

(54) ELIMINATING FALSE PREDICTORS IN DATA-MINING

(71) Applicant: INTERNATIONAL BUSINESS MACHINES CORPORATION, Armonk, NY (US)

(72) Inventors: Miao He, Beijing (CN); Changrui Ren, Beijing (CN); Bing Shao, Beijing (CN); Ming Xie, Beijing (CN); Jian Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/070,748

(22) Filed: Mar. 15, 2016

(65) Prior Publication Data
US 2017/0270170 A1    Sep. 21, 2017

(51) Int. Cl.
*G06F 7/00* (2006.01)
*G06F 17/30* (2006.01)
*G06N 99/00* (2019.01)

(52) U.S. Cl.
CPC .. *G06F 17/30539* (2013.01); *G06F 17/30477* (2013.01); *G06N 99/005* (2013.01); *G06F 2216/03* (2013.01)

(58) Field of Classification Search
CPC ........ G06F 17/30539; G06F 17/30477; G06N 99/005
USPC ................. 707/718, 722, 769, 776
See application file for complete search history.

(56) References Cited

U.S. PATENT DOCUMENTS

| | | | |
|---|---|---|---|
| 6,134,555 A | 10/2000 | Chadha et al. | |
| 7,478,106 B2 | 1/2009 | Heckerman | |
| 7,567,972 B2 | 7/2009 | Geiselhart et al. | |
| 7,895,168 B2 | 2/2011 | Barbee et al. | |
| 2008/0027886 A1 | 1/2008 | Kowalczyk et al. | |
| 2011/0119300 A1 | 5/2011 | Marcade | |
| 2011/0246409 A1 | 10/2011 | Mitra | |
| 2015/0112903 A1* | 4/2015 | Chan ................. | G06F 17/30961 706/12 |

OTHER PUBLICATIONS

Anitha et al., "Survey on Feature Selection in High-dimensional data via Constraint, Relevance and Redundancy", vol. 03, Issue 09, Sep. 2014, pp. 244-247.

(Continued)

*Primary Examiner* — Md I Uddin
(74) *Attorney, Agent, or Firm* — Cantor Colburn LLP; Vazken Alexanian

(57) ABSTRACT

Technical solutions are described for improving a data-mining process for identifying a desired population of a dataset. An example computer-implemented method includes, receiving the dataset that includes a plurality of data dimensions. The method also includes determining a set of predictors for a target variable, where a predictor is a data dimension that is relevant to the target variable. The method also includes identifying from the set of predictors, a false predictor, where the false predictor is a data dimension that results in an empty set of the desired population. The method also includes removing the false predictor from the set of predictors used for the data-mining process for identifying the desired population of the dataset.

15 Claims, 9 Drawing Sheets

(56) References Cited

OTHER PUBLICATIONS

Malavika et al.,"Reduction of Dimensionality for High Dimensional Data using Correlation Measures", vol. 11, No. 1, 2015, pp. 107-111.
Saravanan et al., "A Novel Approach of Horizontal Aggregation in SQL for Data Mining", vol. 9 No. 1, Mar. 2014, pp. 45-47.

* cited by examiner

|  | Null hypothesis ($H_0$) is | |
|---|---|---|
|  | Valid/True | Invalid/False |
| Judgement of Null Hypothesis ($H_0$) — Reject | Type I error / False Positive | Correct inference / True Positive |
| Judgement of Null Hypothesis ($H_0$) — Fail to reject (accept) | Correct inference / True Negative | Type II error / False negative |

Fig. 4

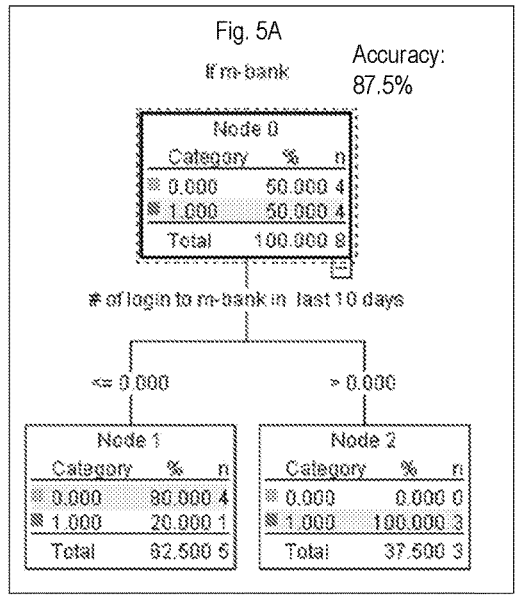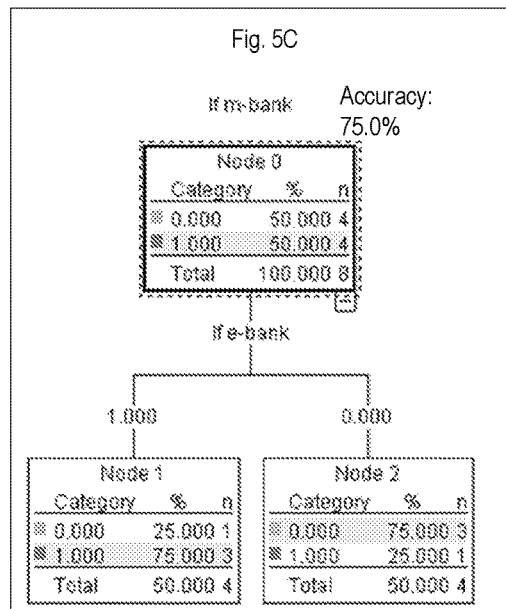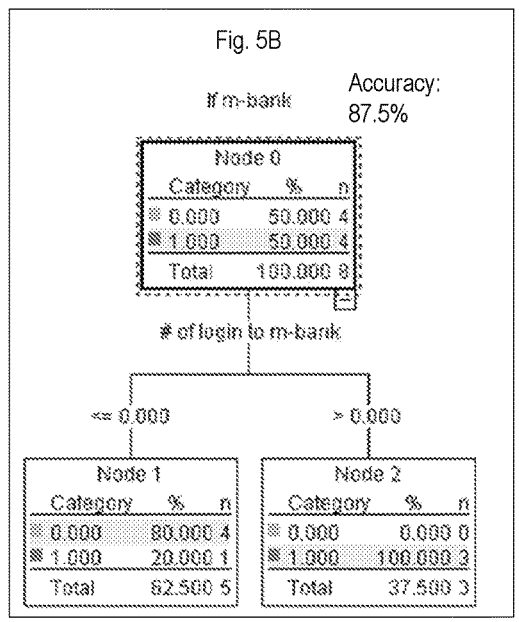

ELIMINATING FALSE PREDICTORS IN DATA-MINING

BACKGROUND

The present application relates to computer technology, and more specifically, to improving data mining.

Data mining is generally a computational process of discovering patterns in a large dataset. Aside from raw analysis of the large dataset, data mining involves database and data management, data pre-processing, model and inference considerations, complexity considerations, post-processing of discovered structures, visualization, and online updating of the large data sets. For example, the large datasets may include hundreds of thousands of data dimensions, which are be fed into a data mining model to identify dimensions which are predictors of a target variable.

SUMMARY

According to an embodiment, a computer implemented method for improving a data-mining process for identifying a desired population of a dataset includes, receiving, by a processor, the dataset that includes a plurality of data dimensions. The method also includes determining a set of predictors for a target variable, where a predictor is a data dimension that is relevant to the target variable. The method also includes identifying from the set of predictors, a false predictor, where the false predictor is a data dimension that results in an empty set of the desired population. The method also includes removing the false predictor from the set of predictors used for the data-mining process for identifying the desired population of the dataset.

In another example embodiment, a system for improving a data-mining process for identifying a desired population of a dataset includes a memory and a processor. The processor determines a set of predictors for a target variable, where a predictor is a data dimension from a plurality of data dimensions of the dataset, the predictor being relevant to the target variable. The processor also identifies from the set of predictors, a false predictor, where the false predictor is a data dimension that results in an empty set of the desired population. The processor also removes the false predictor from the set of predictors used for the data-mining process for identifying the desired population of the dataset.

In yet another example embodiment, a computer program product for improving a data-mining process for identifying a desired population of a dataset includes a computer readable storage medium. The computer readable storage medium includes computer executable instructions to determine a set of predictors for a target variable, where a predictor is a data dimension from a plurality of data dimensions of the dataset, the predictor being relevant to the target variable. The computer readable storage medium also includes computer executable instructions to identify from the set of predictors, a false predictor, where the false predictor is a data dimension that results in an empty set of the desired population. The computer readable storage medium also includes computer executable instructions to remove the false predictor from the set of predictors used for the data-mining process for identifying the desired population of the dataset.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 4 illustrates types of errors caused because of using a deterministic rule to identify predictors in a data-mining process in accordance with an embodiment.

FIG. 5A illustrates an example result of identifying a predictor in accordance with an embodiment.

FIG. 5B illustrates an example result of identifying a predictor in accordance with an embodiment.

FIG. 5C illustrates an example result of identifying a predictor in accordance with an embodiment.

DETAILED DESCRIPTION

Disclosed here are technical solutions for improving computerized data mining processes by filtering a set of predictors of a target dimension to identify a false predictor. A predictor is a dimension from the dataset being mined, that the data mining process finds to be statistically relevant to a target hypotheses. A false predictor identified by the technical solutions described herein is one of such predictors, which is statistically relevant, and yet useless to predict a target variable that is part of the target hypotheses.

For example, consider a data-mining example from a banking domain. The data-mining example is attempting to predict which customers are likely to open a mobile banking account. In this example, a number of times that a customer has logged into a mobile banking account may be statistically relevant for the desired prediction, and yet a false predictor; because, in this scenario, the user who does not have a mobile banking account yet, would have zero logins. Thus, analyzing and/or using the number of mobile banking account logins as a dimension makes the data-mining process inefficient as computational power and time are being spent on analyzing a false predictor. Further, the dataset may include data dimensions that are based on the false predictor, for example, an average number of logins in the past 90, 60, 30 days, or a number of logins per day, and other such operations that use the number of logins into a mobile banking account. Analyzing such additional cogenetic data dimensions of the false predictor makes the data-mining further inefficient. Thus, the technical solutions described herein facilitate improving the data-mining, by improving the efficiency of the data-mining, by efficiently filtering the false predictor and the cogenetic data dimensions of the false predictor from the data-mining. Thus, instead of a time-consuming trial-and-error approach, the technical solutions described herein improves efficiency in terms of time. Accordingly, the data-mining processes fewer number of predictors, which leads to improvement in the amount of computational resources and time used for the data-mining.

Figure 1:
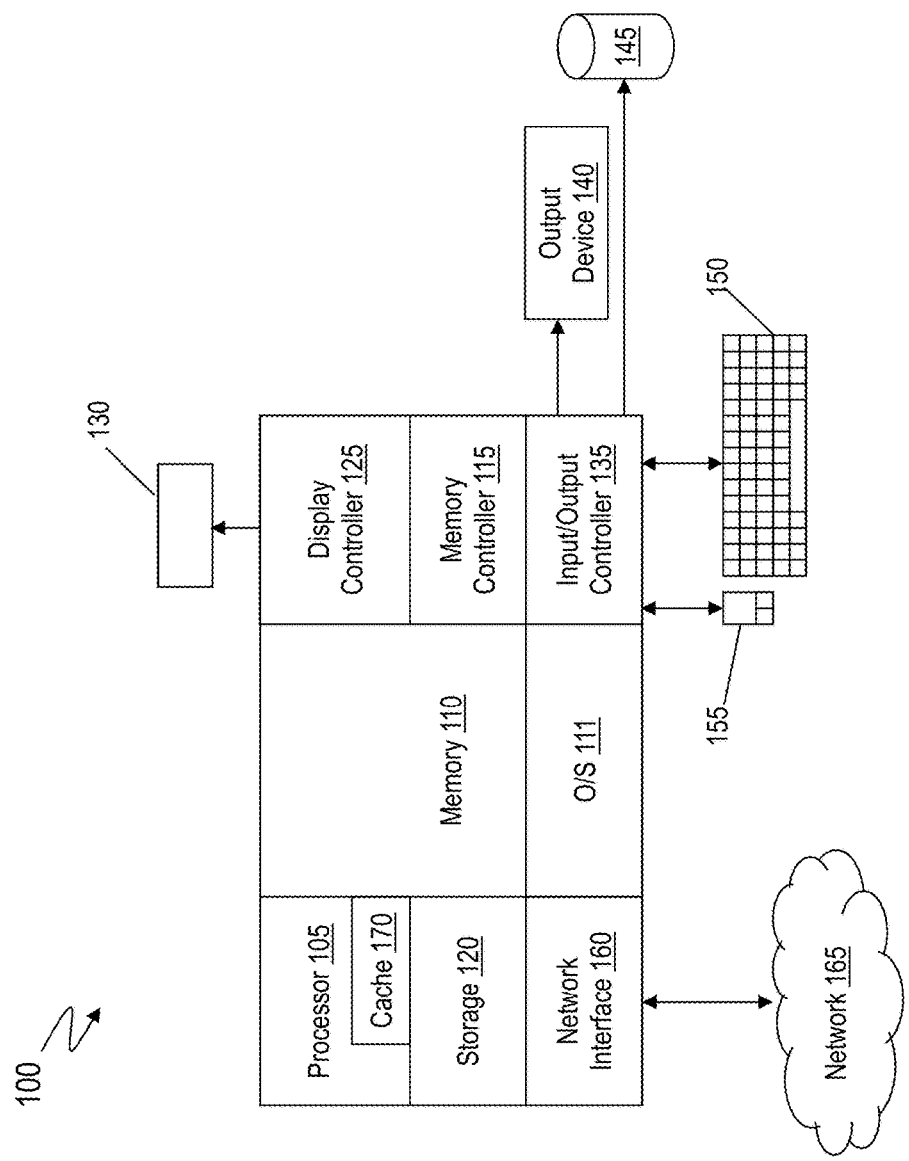
FIG. 1 illustrates an example system for implementing an improvement to a data-mining process by identifying and removing false predicts in accordance with an embodiment.

FIG. 1 illustrates an example system 100 that may implement the technical solutions described herein. For example, the system 100 may implement the data-mining process and the improvement to the data-mining process described herein. Alternatively, the system 100 may implement the improvement to the data-mining and identify the filtered false predictor and corresponding cogenetic data to another system that in turn performs the data-mining. For example, the system 100 may be a communication apparatus, such as a computer. For example, the system 100 may be a desktop computer, a tablet computer, a laptop computer, a phone, such as a smartphone, a server computer, or any other device that communicates via a network 165. The system 100 includes hardware, such as electronic circuitry.

The system 100 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

Figure 2:
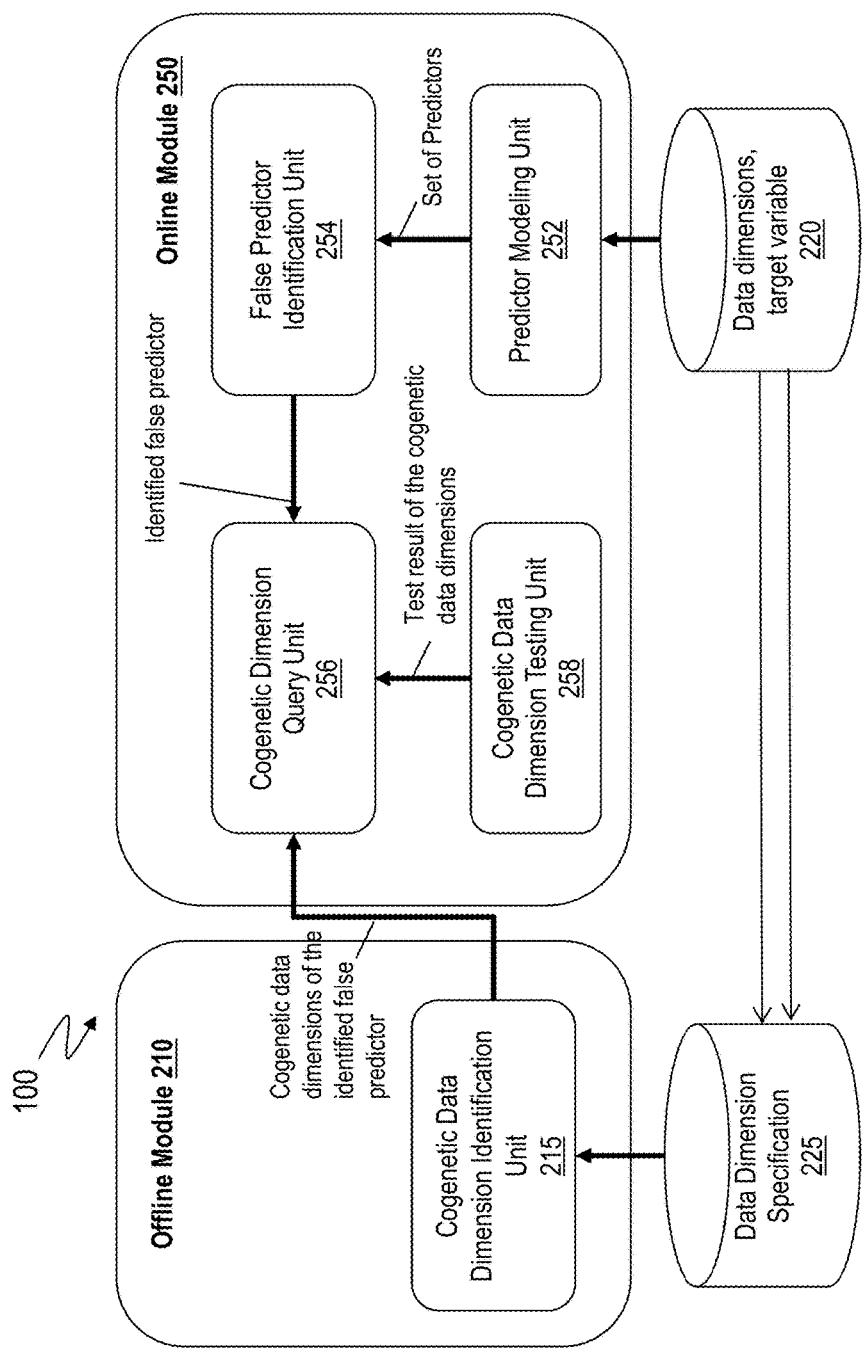
FIG. 2 illustrates another example view of a system for identifying and removing false predictors in a data-mining process in accordance with an embodiment.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The system 100 may further include a display controller 125 coupled to a user interface or display 130. In some embodiments, the display 130 may be an LCD screen. In other embodiments, the display 130 may include a plurality of LED status lights. In some embodiments, the system 100 may further include a network interface 160 for coupling to a network 165. The network 165 may be an IP-based network for communication between the system 100 and an external server, client and the like via a broadband connection. In an embodiment, the network 165 may be a satellite network. The network 165 transmits and receives data between the system 100 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

FIG. 2 illustrates another example view of the system 100 for identifying and removing the false predictors. For example, the system 100 includes an offline module 210 and an online module 250. Both the offline module 210 and the online module 250 may have access to input data 220, which may include the data dimensions of the dataset that is to be mined and a target variable. The target variable identifies the desired population that is mined from the dataset.

For example, the desired population may be a list of names of customers to target to promote mobile banking. In another example, the desired population may be a list of customers who are highly likely to become a gold member with a brand of hotels. Of course, other populations may be desired in other domains based on the dataset being datamined and purpose of the data-mining. The target variable may be identified and entered based on the desired population. The system 100 may receive the target variable as part of the input data 220. In addition, the system 100 receives the dataset for mining as part of the input data 220. Alternatively, the system 100 receives access to the dataset, which may be stored in a remote location. The system 100 may further receive a list of the data dimensions of the dataset. Alternatively, the system 100 may generate the list of the data dimensions by accessing the dataset. For example, the number of data dimensions may be on the order of thousands or more.

The data dimensions may include untransformed as well as transformed data dimensions. An untransformed data dimension is a raw data. For example, in the banking domain the untransformed data dimensions may include gender, age, education, industry, # of financial product purchase, if e-bank, # of m-bank logins, among others. In another example of hoteling domain, the data dimensions may include gender, age, education, # of stays last year, # of nights last year, $ spent last year, # of gold statuses, # of lifetime nights, # of lifetime stays, among others. A transformed data dimension is a data dimension that is obtained by operating one or more untransformed or other transformed data dimensions. The operation for the transformed data dimension may be specified in a computer executable language such as SQL. For example, a transformed data dimension is obtained by performing one or more of the operations such as SUM, AVERAGE, MIN, MAX, using one or more of the untransformed and/or other transformed data dimensions.

The system 100 accesses such data dimension specification 225 of each transformed data dimension in the dataset. For example, the data dimension specification 225 may include SQL for the transformed data dimensions of the dataset. In an example, the offline module 210 may access the data dimension specification and identify cogenetic data dimensions. A data dimension CD is a cogenetic data dimension of another data dimension D if CD and D are in the same table and CD is a transformed data dimension of D. In other words, the cogenetic data dimension CD is obtained by selecting the dimension D from the same table, and operating (SUM, MAX, MIN, AVG) on the data dimension D, such as using SQL. Table 1 illustrates a few examples of cogenetic data dimensions being generated.

TABLE 1

Select SUM(t.# of login to m-bank per day) from Table t
Select SUM(t.# of login to m-bank per day) from Table t where t.month between "2014-01" and "2014-12"
Select SUM(t.# of login to m-bank per day) from Table t where t.month between "2014-01" and "2014-02"
Select MAX(t.# of login to m-bank per day) from Table t where t.month between "2014-01" and "2014-02"
Select MIN(t.# of login to m-bank per day) from Table t where t.month between "2014-01" and "2014-02"

The offline module 210 may include a cogenetic data dimension identification unit 215. For example, the cogenetic data dimension identification unit 215 may be a SQL analyzer, that maps the cogenetic data dimensions as the transformed data dimensions that rely on other data dimensions in the same table. The cogenetic data dimension identification unit 215 identifies the cogenetic data dimensions among the data dimensions in the dataset. In an example, the cogenetic data dimension identification unit 215 operates in an offline manner, where that is separate from the data-mining and/or the improvement of the data-mining process. The online module 250, or any other component of the system 100 queries the cogenetic data dimension identification unit 215 to identify the cogenetic data dimensions of a specific data dimension.

For example, the online module 250 upon identification of a particular data dimension that is to be removed from consideration during the data-mining, may query the offline module 210 to identify any cogenetic data dimensions of the particular data dimension, which may also be removed from the consideration.

For example, the online module 250 identifies a set of predictors to identify the desired population by data-mining the dataset. The online module 250 may further filter the set of predictors to identify a false predictor from the set of predictors. The online module 250 may remove the false predictor from the set of predictors. In another example, the online module 250 removes the false predictor from consideration during the data-mining of the desired population. Further yet, the online module 250, by querying the offline module 210, identifies the cogenetic data dimensions of the false predictor. The online module 250 may further remove the cogenetic data dimensions from the set of predictors and/or consideration during the data-mining.

In an example, the online module may include a predictor modeling unit 252, a false predictor identification unit 254, a cogenetic dimension query unit 256, and a cogenetic data dimension testing unit 258, among other components.

The predictor modeling unit 252 may be hardware, such as electronic circuitry like ASIC, FPGA, processor, or any other hardware unit. In addition, the predictor modeling unit 252 may include computer executable instructions stored on a computer readable storage medium. The predictor modeling unit 252 may identify a set of predictor data dimensions from the dataset for the desired population. In an example, the predictor modeling unit 252 identifies the set of predictors based on a training dataset, which may be a subset of the input dataset. For example, the online module 250 selects a subset of the dataset as the training dataset, where the training dataset may be selected randomly or in a predetermined manner.

Figure 3:
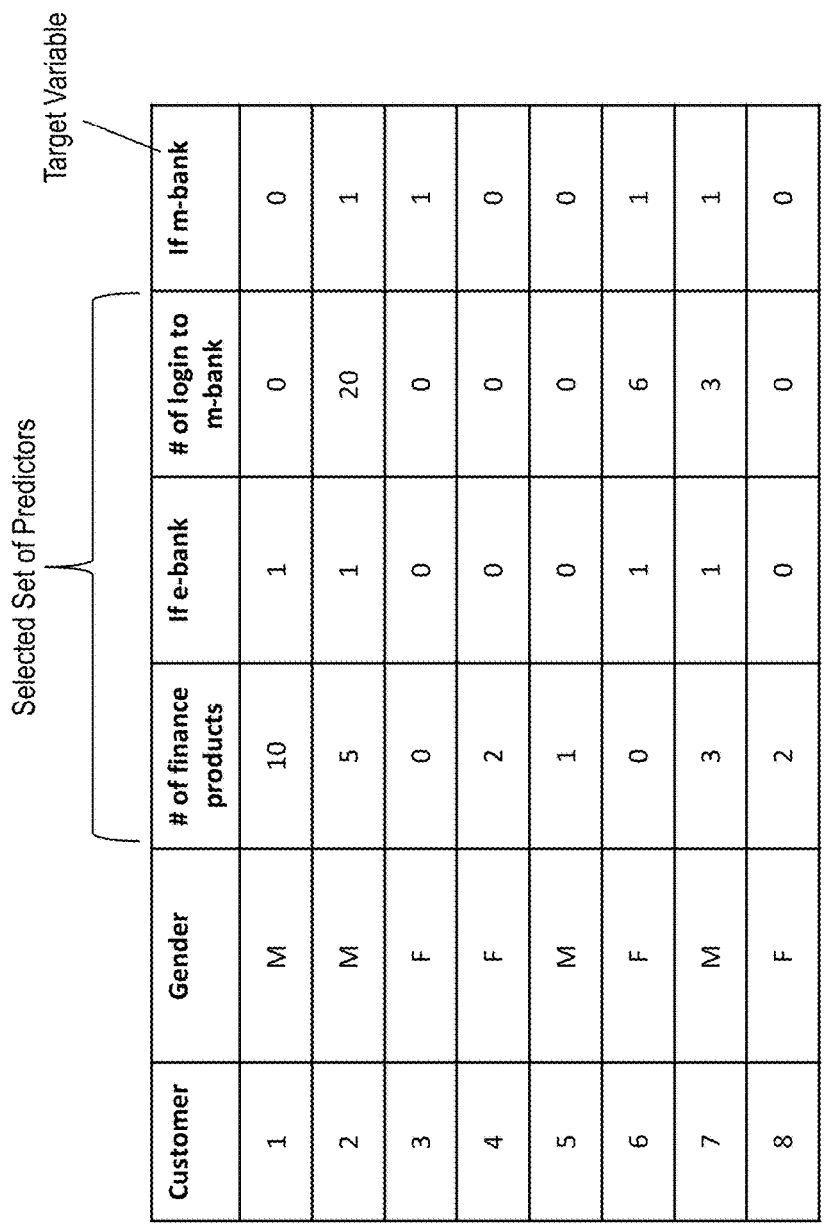
FIG. 3 illustrates an example dataset in accordance with an embodiment.

For example, the predictor modeling unit 252 may include a decision tree modeler for identifying the set of predictors. Alternatively or in addition, the predictor modeling unit 252 may identify the set of predictors based on statistical relevance of the data dimensions and the target variable associated with the desired population. For example, consider the example dataset of banking customers illustrated in FIG. 3. Consider that the desired population is a list of customers who are likely to enroll in mobile-banking (m-bank). The predictor modeling unit 252 identifies, based on a decision tree that the dataset includes two female and two male customers with e-bank accounts open/not open, and hence the gender is an irrelevant data dimension for the desired data population. Further, the predictor modeling unit 252 identifies that three out of the four m-bank users have an e-bank account (e-bank=1), and hence selects the data dimension 'e-bank' as a predictor. In addition, in this example, the predictor modeling unit 252 identifies that three out of four m-bank users have non-zero # of logins to m-bank accounts, and hence selects the '# of login to m-bank' dimension as a predictor.

The false predictor identification unit 254 receives the set of predictors from the predictor modeling unit 252. The false predictor identification unit 254 may be hardware, such as electronic circuitry like ASIC, FPGA, processor, or any other hardware unit. In addition, the false predictor identification unit 254 may include computer executable instructions stored on a computer readable storage medium. The false predictor identification unit 254 filters the set of predictors from the predictor modeling unit 252 and identifies one or more false predictors from the set of predictors. For example, in the ongoing banking scenario, all the customers in the desired population have zero # of login to m-bank, since the desired population (potential m-bank customers) do not have an m-bank account yet. Thus, in this example the identified set of predictors includes the '# logins to m-bank' data dimension, since it is deemed a relevant data dimension, although the '# logins to m-bank' data dimension is a prerequisite data dimension.

Typically, the predictor modeling unit 252 uses a deterministic rule to identify the set of predictors. FIG. 4 illustrates that typically, using a deterministic rule to Type I (false positive) and Type II errors (false negative). Further, FIGS. 5A, 5B, and 5C illustrate example scenarios of selecting different attributes from the example dataset in FIG. 3 as predictors for the desired population of potential customers for m-banking. For example in FIG. 5A, the predictor modeling unit 252 classifies the sample population based on customers that already have a mobile banking account (Node 0, 'if m-bank'). Accordingly, the predictor modeling unit 252 classifies the eight sample data items from the example dataset in FIG. 3, to determine that 50% of the customers already have a mobile banking account. From the two sets of customers (one with and one without a mobile-banking account), the predictor modeling unit 252 infers (wrongly), with an accuracy of 87.5% that '# of logins to m-bank' is a predictor for the desired population of potential m-bank customers. Similarly, the predictor modeling unit 252, as illustrated in FIG. 5B infers (wrongly) with an accuracy of 87.5% that '# logins to m-bank in last 10 days' is a predictor for the desired population of potential m-bank customers. FIG. 5C illustrates an example of the predictor modeling unit 252 (correctly) inferring with 75% accuracy that whether the customer has an e-banking account 'if e-bank' is a predictor for the desired population of potential m-bank customers. This exemplifies that the typical use of a percentage of correct inference to exclude "false" predictors cannot be a basis for identifying a false predictor. (False predictors in above example had higher accuracies than the true predictor).

Figure 6:
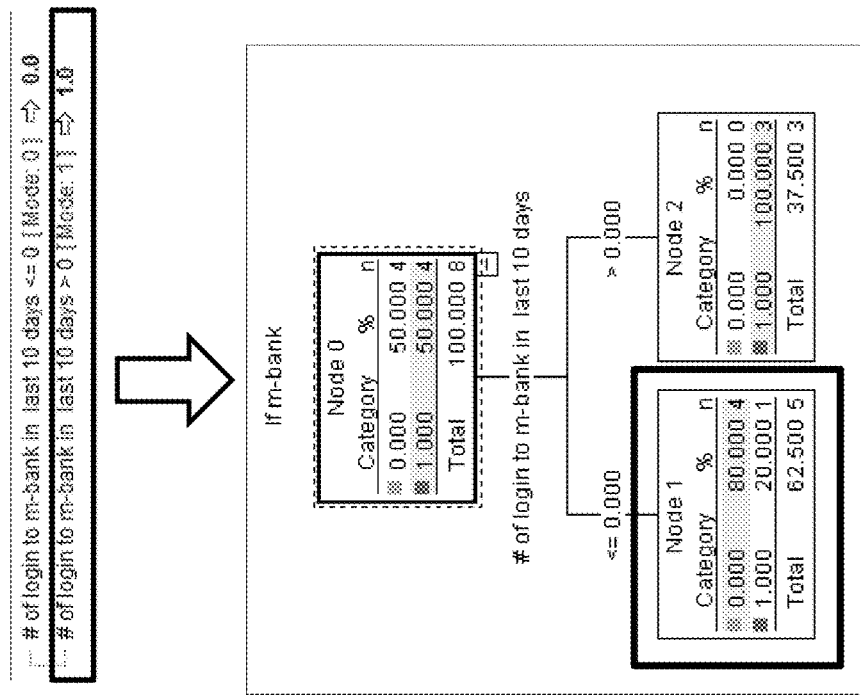
FIG. 6 illustrates an example false predictor in accordance with an embodiment.

Accordingly, the technical solutions described herein facilitate the false predictor identification unit 254 to identify the false predictor as a predictor that classifies no potential cases into the desired population. For example, in the ongoing banking example, if m-bank=true, is a false predictor. FIG. 6 illustrates that '# logins to m-bank in last 10 days' is a false predictor since none of the four customers without m-bank (Node 0) have logged in to an m-bank account (Node 1). In other words, all of the four customers without m-bank account have zero (0) logins to an m-bank account. That is, if the only rule used to select a list of name in the desired population is whether '# logins to m-bank in last 10 days>0?', the name list will have zero records for the customers without m-bank accounts, because no one could have m-bank logins without open an m-bank account first. In generic terms, false predictor identification unit 254 determines if a predictor>predetermined value (or <predetermined value) results in a zero-set of the desired population from the testing dataset. If a zero-set is obtained, the predictor is identified as the false predictor.

The cogenetic dimension query unit 256 queries the cogenetic data dimension identification unit 215 to provide the cogenetic data dimensions of the false predictor. The cogenetic data dimension testing unit 258 tests the cogenetic data dimensions to determine which of the cogenetic data dimensions are false predictors for the desired population are. For example, consider an example of hotel reward program, where a stay of at least 25 nights makes is awarded a gold card. Now consider that the desired population from existing customer data is a list of potential gold card customers. Now, a number of nights stay in the entire last year is a false predictor for potential gold customers for the current year, however the nights in the first half of last year, may be a valid predictor. However, both the number of nights for the entire year and the number of nights for the first half of the year is generated from the same table, and thus the cogenetic data dimension identifying unit 215 identifies the two data dimensions as being cogenetic. The cogenetic data dimension testing unit 258 tests whether the cogenetic dimensions are to be removed from the set of predictors or from consideration for the desired population.

Figure 7:
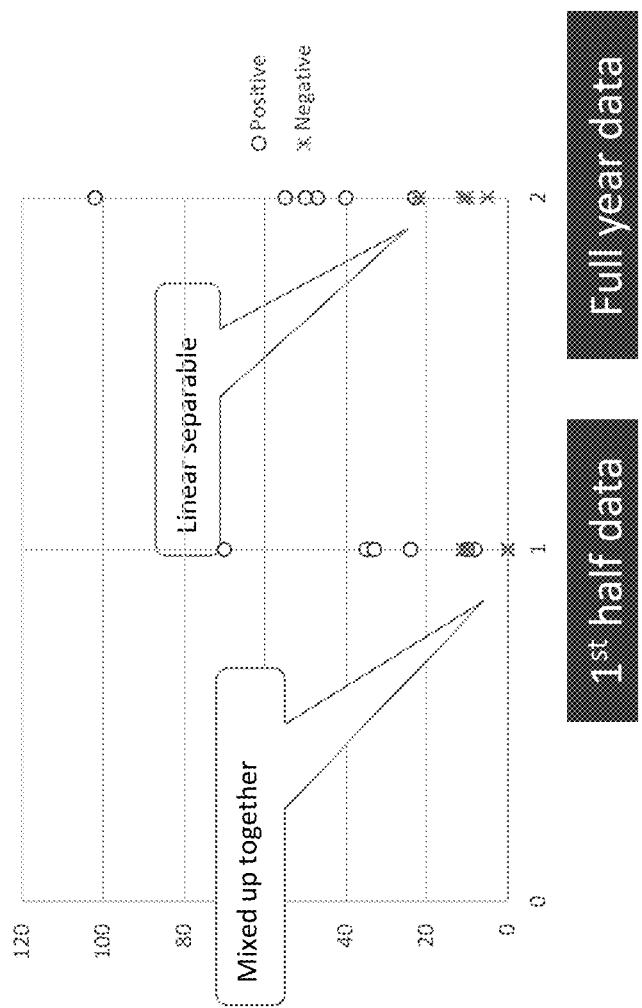
FIG. 7 illustrates linear separation of positive and negative cases of a data dimension in accordance with an embodiment.

In an example, the cogenetic data dimension testing unit 258 does not eliminate all cogenetic data dimensions unless the desired (e.g., positive/negative) cases and the undesired (e.g., negative/positive) cases are linearly separable. For example, to test the linear separation, the cogenetic data dimension testing unit 258 uses a min-max test between negative and positive cases for the cogenetic data dimensions. For example, given a particular data dimension, the cogenetic data dimension testing unit 258 determines if min of all positive cases>=max of all negative cases for the data dimension. Additionally or alternatively, the cogenetic data dimension testing unit 258 determines if min of all negative cases>=max of all positive cases. If either of the above conditions are satisfied, the cogenetic data dimension testing unit 258 eliminates the data dimension from the set of predictors and/or from consideration for the desired population. FIG. 7 illustrates the cogenetic data dimension testing unit 258 testing linear separation of positive and negative cases of the data dimensions from the hoteling example—data for the entire last year and the data for the first half of the last year. In an example, the populations illustrated in FIG. 7 may be based on selection according to Table 2. As illustrated, in this particular example, the cogenetic data dimension testing unit 258 identifies that the entire year data is linearly separable, while the first half year data is not linearly separable. Accordingly, the first half year data is not eliminated as false predictor in this case based on the min-max testing by the cogenetic data dimension testing unit 258.

TABLE 2

Full year data:
Select SUM(t.# of nights per day) from Table t where t.month between "2014-01" and "2014-12"
1st half data:
Select SUM(t.# of nights per day) from Table t where t.month between "2014-01" and "2014-6"

Figure 8:
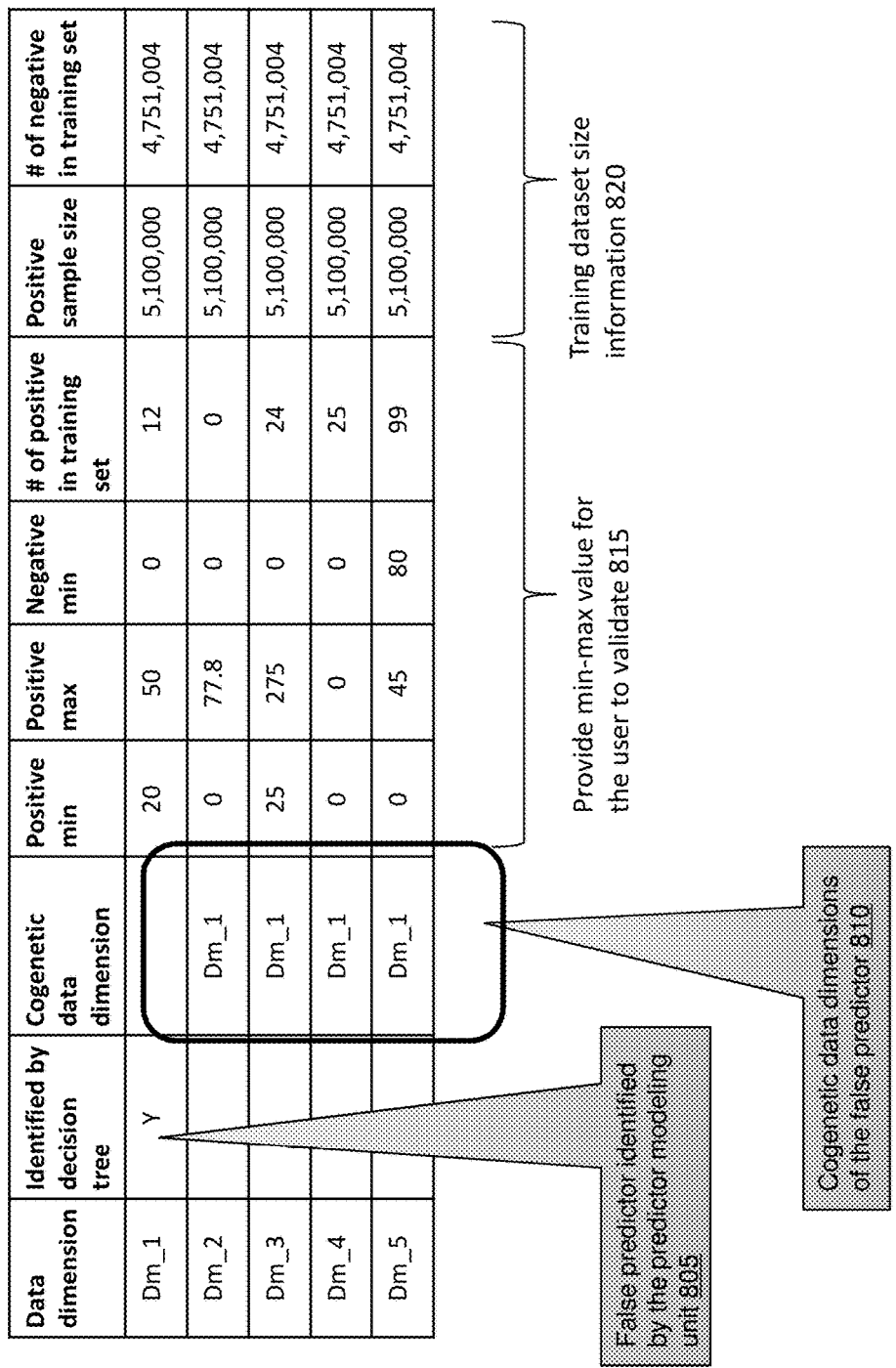
FIG. 8 illustrates an example output of cogenetic data dimension test data in accordance with an embodiment.

In an example, the results of the cogenetic data dimension testing unit 258 are output to a user to select whether to keep or remove the cogenetic data dimensions from the set of predictors. For example, if the training set is smaller than a predetermined threshold, such as a total number of items in the training dataset is smaller than the predetermined threshold, the training dataset may not reflect the statistical significance of the dataset being data-mined. Accordingly, in such cases, the technical solutions described herein to prevent false alarms, output the findings of the cogenetic data dimension testing unit 258 along with other data from the other units, for the user to validate the removal (or keeping) of the predictors in the set of predictors. FIG. 8 illustrates an example display, where a user-interface identifies the false predictor 805 that the false predictor identification unit 254 identified along with the corresponding cogenetic data dimensions 810. The user-interface further displays results of the min and max values 815 as determined by the cogenetic data dimension testing unit 258. In an example, the user-interface further displays the sample sizes 820 so that the user can validate the removal (or keeping) of the data dimensions from the set of predictors. For example, the larger the data size is, the more statistically significant the conclusion.

Figure 9:
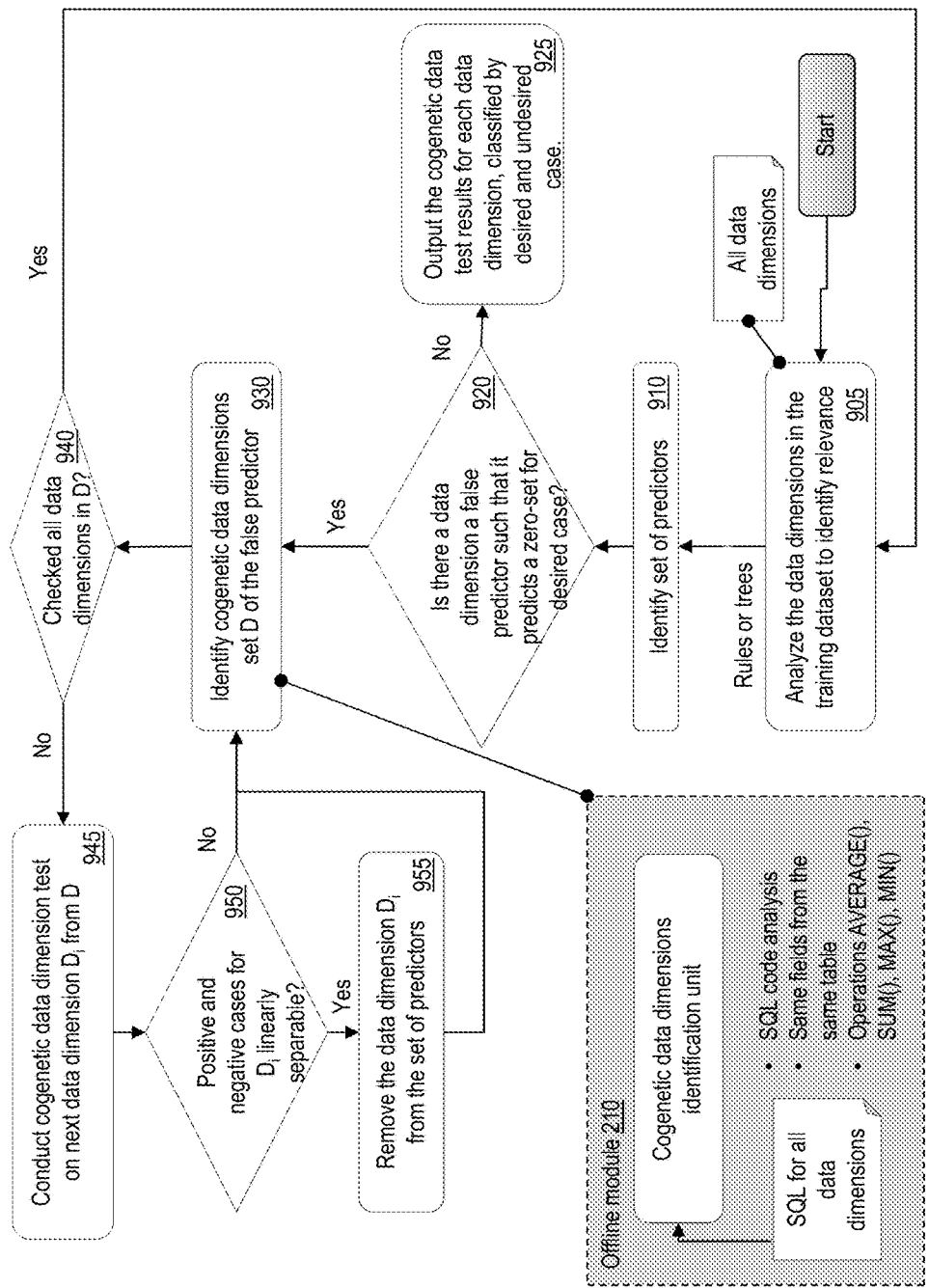
FIG. 9 illustrates a flowchart of example logic to identify and remove false predictors during a data-mining process in accordance with an embodiment.

FIG. 9 illustrates a flowchart of an example method to identify and remove a false predictor according to the technical solutions described above. The method may be implemented by a processor in an apparatus such as a computer, like a server computer, a desktop, a laptop, or any other form factor. The method may be implemented by executing computer executable instructions, which may be stored on one or more computer readable storage medium. For example, the system 100 implements the method. FIG. 9 illustrates the operations performed in a particular order, however in other examples, the order of the operations may be modified. For example, the system 100 may receive the dataset that is to be mined to identify the desired population. The system 100 analyzes the data dimensions in the dataset using a training dataset to identify the relevance or relationship between the data dimensions, as shown at block 905. For example, the predictor modeling unit 252 determines the relevance using a decision tree modeler and/or based on statistical significance. The system 100 uses the rules or trees based on the analysis to identify the set of predictors, as shown at block 910.

The system 100 further identifies a false predictor from the set of predictors, as shown at block 920. For example, the false predictor identification unit 254 determines if a data dimension is a false predictor if that data dimension results in a zero-set for the desired population, as shown at block 920. If such a false predictor is identified, the system 100 identifies a set D of cogenetic data dimensions of the false predictor, as shown at block 930. For example, the cogenetic data dimensions query unit 256 queries the cogenetic data dimensions identification unit 215 for the set D. The cogenetic data dimensions identification unit 215 may identify the cogenetic data dimensions in an offline manner.

The system 100 tests each of the cogenetic data dimensions $D_i$ from the set D, as shown at block 940 and 945. The test identifies if the positive and negative case for a data dimension $D_i$ are linearly separable, as shown at block 950. In an example, the cogenetic data dimension test unit 258 tests the linear separation using a min-max test, as described earlier. In case the cogenetic data dimension test unit 258 determines that the positive and negative cases are linearly separable, the system 100 may remove $D_i$ from the set of predictors, as shown at block 955. Else, if linear separation is not detected, $D_i$ is not removed, that is, $D_i$ is maintained in the set of predictors. In an example, the set D includes the false predictor that was initially identified, at block 920. Alternatively, the false predictor is removed from the set of predictors at block 920 itself.

In an example, if the size of the testing dataset is less than a predetermined threshold, the system 100 outputs the results of the cogenetic data dimensions testing unit 258, as shown at block 925. The output facilitates a user to validate the removing and/or maintaining of the data dimensions that are identified as false predictors from the set of predictors. The system 100 may continue to identify additional sets of predictors and/or false predictors in an iterative manner, to reduce the number of dimensions to mine for the entire dataset.

In another example, the system 100 may iterate over the set of predictors to identify data dimension with no cases classified as desired population, that is, all the false predictors from the set of predictors. The system 100 may then iterate on the identified false predictors and identify the cogenetic data dimensions of each false predictor to formulate a data dimension set containing all the data dimensions that are to be removed from the set of predictors. Finally, the system 100 may remove the identified false predictors and corresponding cogenetic data dimensions that are identified to be false predictors. Alternatively, the system 100 outputs the results of the identified false predictors for the user to validate removing/maintaining the data dimensions from the set of predictors.

Thus, the technical solutions described herein help improve efficiency of a data-mining process by facilitating a system to identify false predictors from a set of predictors for a desired population. The technical solutions thus facilitate improving technical solutions embedded in computer technology. The technical solutions improve the efficiency of the data-mining process by using a rule-based model to keep the data dimensions of the dataset being mined untransformed. Further, the system, using the technical solutions, is facilitated to identify the untransformed data dimension (false predictor), which leads to zero-set classification of unknown samples into the desired population. In addition, the technical solutions described herein identify the cogenetic data dimensions of the false predictor, such as by applying SQL analysis. The system tests the cogenetic data dimensions, such as by performing a min-max test, to identify if the cogenetic data dimensions are also to be removed from the set of predictors.

Thus, the technical solutions facilitate the system to identify and eliminate false predictors, but maintaining true predictors from a set of predictors that a predictor modeling unit may have identified. Identifying such false predictors in industry-sized datasets for data-mining processes helps improve the data-mining process by orders of magnitude by shrinking the search space for prerequisites combinations.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for improving a data-mining process, the method comprising:
   receiving, by a processor, a dataset that comprises a plurality of data dimensions, each data dimension representing an attribute from the dataset;
   identifying a desired population of the dataset, wherein the desired population is a data dimension from a table in the dataset;
   determining, by the processor, a set of predictors for a target variable representative of the desired population, wherein a predictor is a data dimension that is relevant to the target variable;
   identifying, by the processor, from the set of predictors, a false predictor, wherein the false predictor is a data dimension that results in an empty set of the desired population;
   removing, by the processor, the false predictor from the set of predictors used for the data-mining process for identifying the desired population of the dataset;
   identifying, by the processor, a set of cogenetic data dimensions of the false predictor, wherein a cogenetic data dimension is a data dimension that is based on an operation that includes the false predictor; and
   removing, by the processor, the cogenetic dimensions of the false predictor from the set of predictors used for the data-mining process for identifying the desired population of the dataset;
   analyzing the set of cogenetic data dimensions of the false predictor for determining linearly separable cogenetic data dimensions from the set of cogenetic data dimensions using min-max test between negative and positive cases for the cogenetic data dimensions;
   wherein the linearly separable cogenetic data dimensions of the false predictor are removed from the set of predictors;
   selecting, by the processor, a subset of the dataset as a training dataset, wherein the set of predictors is identified based on the training dataset; and
   using, by the processor, the set of predictors determined based on the training dataset for the data-mining for the desired population from the entire dataset.

2. The computer implemented method of claim 1, wherein the set of cogenetic data dimensions of the false predictor is identified by analyzing computer program code of the one or more data dimensions in the set of predictors.

3. The computer implemented method of claim 1, wherein determining a linearly separable cogenetic data dimension from the set of cogenetic data dimensions comprises:
   determining a minimum number of positive cases for the cogenetic data dimension;
   determining a maximum number of negative cases for the cogenetic data dimension; and
   in response to the minimum number of positive cases being greater than or equal to the maximum number of negative cases, selecting the cogenetic data dimension as a linearly separable cogenetic data dimension.

4. The computer implemented method of claim 1, wherein determining the linearly separable cogenetic data dimension from the set of cogenetic data dimensions comprises:
   determining a minimum number of negative cases for the cogenetic data dimension;
   determining a maximum number of positive cases for the cogenetic data dimension; and
   in response to the minimum number of negative cases being greater than or equal to the maximum number of positive cases, selecting the cogenetic data dimension as a linearly separable cogenetic data dimension.

5. The computer implemented method of claim 1, further comprising:
   outputting, by the processor, the linearly separable cogenetic data dimensions;
   receiving, by the processor, a selection of the linearly separable cogenetic data dimensions; and
   in response, removing, by the processor, the cogenetic data dimensions that are selected from the set of predictors used for the data-mining process for identifying the desired population of the dataset.

6. The computer implemented method of claim 2, wherein the set of cogenetic data dimensions is identified in an offline manner by analyzing the computer program code that includes query language associated with the data dimensions from the set of predictors.

7. The computer implemented method of claim 1, wherein the set of predictors for the target variable is determined using a decision tree model with untransformed data-dimensions of the dataset.

8. A system for a data-mining process, the system comprising:
   a memory; and
   a processor configured to:
      identify a desired population of a dataset that comprises a plurality of data dimensions, each data dimension representing an attribute from the dataset, wherein the desired population is a data dimension from a table in the dataset;
      determine a set of predictors for a target variable that is representative of the desired population, wherein a predictor is a data dimension from a plurality of data dimensions of the dataset, the predictor being relevant to the target variable;
      identify from the set of predictors, a false predictor, wherein the false predictor is a data dimension that results in an empty set of the desired population;
      remove the false predictor from the set of predictors used for the data-mining process for identifying the desired population of the dataset;
      identify a set of cogenetic data dimensions of the false predictor, wherein a cogenetic data dimension is a data dimension that is based on an operation that includes the false predictor;
      remove the cogenetic dimensions of the false predictor from the set of predictors used for the data-mining process for identifying the desired population of the dataset;
      analyze the set of cogenetic data dimensions of the false predictor for determining linearly separable cogenetic data dimensions from the set of cogenetic data dimensions using min-max test between negative and positive cases for the cogenetic data dimensions, wherein the linearly separable cogenetic data dimensions of the false predictor are removed from the set of predictors;
      select a subset of the dataset as a training dataset, wherein the set of predictors is identified based on the training dataset; and
      use the set of predictors determined based on the training dataset for the data-mining for the desired population from the entire dataset.

9. The system of claim 8, wherein the set of cogenetic data dimensions of the false predictor is identified by analyzing computer program code of the one or more data dimensions in the set of predictors.

10. The system of claim 8, wherein the processor is further configured to:
    output the linearly separable cogenetic data dimensions;
    receive a selection of the linearly separable cogenetic data dimensions; and
    in response, remove the cogenetic data dimensions that are selected from the set of predictors used for the data-mining process for identifying the desired population of the dataset.

11. The system of claim 9, wherein the set of cogenetic data dimensions is identified in an offline manner based on an analysis of query language associated with the data dimensions of the dataset.

12. A computer program product for a data-mining process, the computer program product comprising a computer readable storage medium, the computer readable storage medium comprising computer executable instructions, wherein the computer readable storage medium comprises instructions to:
    identify a desired population of a dataset that comprises a plurality of data dimensions, each data dimension representing an attribute from the dataset, wherein the desired population is a data dimension from a table in the dataset;
    determine a set of predictors for a target variable that is representative of the desired population, wherein a predictor is a data dimension from a plurality of data dimensions of the dataset, the predictor being relevant to the target variable;
    identify from the set of predictors, a false predictor, wherein the false predictor is a data dimension that results in an empty set of the desired population;
    remove the false predictor from the set of predictors used for the data-mining process for identifying the desired population of the dataset;
    identify a set of cogenetic data dimensions of the false predictor, wherein a cogenetic data dimension is a data dimension that is based on an operation that includes the false predictor;
    remove the cogenetic dimensions of the false predictor from the set of predictors used for the data-mining process for identifying the desired population of the dataset;
    analyze the set of cogenetic data dimensions of the false predictor for determining linearly separable cogenetic data dimensions from the set of cogenetic data dimensions using min-max test between negative and positive cases for the cogenetic data dimensions, wherein the linearly separable cogenetic data dimensions of the false predictor are removed from the set of predictors;
    select a subset of the dataset as a training dataset, wherein the set of predictors is identified based on the training dataset; and
    use the set of predictors determined based on the training dataset for the data-mining for the desired population from the entire dataset.

13. The computer program product of claim 12, wherein the set of cogenetic data dimensions of the false predictor is identified by analyzing computer program code of the one or more data dimensions in the set of predictors.

14. The computer program product of claim 12, wherein the computer readable storage medium further comprises instructions to:
    output the linearly separable cogenetic data dimensions;
    receive a selection of the linearly separable cogenetic data dimensions; and
    in response, remove the cogenetic data dimensions that are selected from the set of predictors used for the data-mining process for identifying the desired population of the dataset.

15. The computer program product of claim 13, wherein the set of cogenetic data dimensions is identified in an offline manner based on an analysis of query language associated with the data dimensions of the dataset.

* * * * *